United States Patent [19]

Tsutsumi

[11] Patent Number: 5,947,400
[45] Date of Patent: Sep. 7, 1999

[54] SPINNING REEL USED FOR FISHING AND HAVING A FRONT FLANGE MEMBER SECURED TO THE SPOOL BODY

[75] Inventor: Wataru Tsutsumi, Toda, Japan

[73] Assignee: Daiwa Seiko, Inc., Tokyo, Japan

[21] Appl. No.: 08/891,344

[22] Filed: Jul. 10, 1997

[30] Foreign Application Priority Data

Jul. 10, 1996 [JP] Japan ................................ 8-007445 U

[51] Int. Cl.⁶ .................................................. A01K 89/00
[52] U.S. Cl. .......................... 242/322; 242/246; 242/319; 242/608.5
[58] Field of Search ................... 242/246, 322, 242/317, 319, 608.5

[56] References Cited

U.S. PATENT DOCUMENTS

| | | | |
|---|---|---|---|
| 3,438,592 | 4/1969 | Posso | 242/608.5 |
| 4,083,450 | 4/1978 | La Mar | 242/608.5 X |
| 5,149,008 | 9/1992 | Oi | 242/246 |
| 5,697,567 | 12/1997 | Sonenvald | 242/322 |
| 5,720,441 | 2/1998 | Chamberlin et al. | 242/322 X |

FOREIGN PATENT DOCUMENTS

| | | | |
|---|---|---|---|
| 975627 | 1/1951 | France | 242/608.5 |
| 4-80363 | 7/1992 | Japan . | |
| 5-39272 | 5/1993 | Japan . | |
| 7-67507 | 3/1995 | Japan . | |

*Primary Examiner*—Donald P. Walsh
*Assistant Examiner*—Emmanuel M. Marcelo
*Attorney, Agent, or Firm*—Sughrue, Mion, Zinn, Macpeak & Seas, PLLC

[57] ABSTRACT

In a spinning reel used for fishing, a spool has a front flange member (2) separately formed from a spool body (1), and integrally secured to the spool body through a fixing member, (3). A recessed portion (1f) is formed in a front and circumferentially inner portion of the spool body. The front flange member contacts a front end of the spool body so as to close a front opening of the recessed portion. The front flange member is secured by means of the fixing member screwed to a cylindrical portion (1e) of the spool body located inside of the recessed portion. A space (A) is defined by the recessed portion and located inside a fishing line winding portion (1a) of the spool body, around which a fishing line is to be wound. No gap is formed between the separate front flange member and the fishing line winding body portion, and the spool is lightened lighter than conventional ones.

7 Claims, 5 Drawing Sheets

SPINNING REEL USED FOR FISHING AND HAVING A FRONT FLANGE MEMBER SECURED TO THE SPOOL BODY

BACKGROUND OF THE INVENTION

The present invention relates to an improvement in a spinning reel used for fishing in which a front flange member of a spool is separately formed from a spool and the front flange member is fixed in front of the spool by means of a fixing member.

A technique is known by which a flange in front of a spool in a spinning reel used for fishing is separately formed of material having high hardness and low frictional characteristic in a ring (shape to thereby keep the flange away from being abrased by a fishing line), and by which a resistance in releasing a fishing line is reduced. The technique is disclosed, for instance, by Japanese Unexamined Utility Model Publication No. 4-80363, Japanese Unexamined Utility Model Publication No. 5-39272, and Japanese Unexamined Patent Publication No. 7-67507. A body portion around which a fishing line is wound, disclosed in those publications, has a relatively deep bottom surface. A flange which is a separate unit from the body portion is mounted and fixed on a location outside and in front of a spool. When a fishing line is wound around the body portion, a connecting portion of the separately formed flange and the body portion is buried below a fishing line, and thus the separately formed flange is fixed with relatively smaller deformation until a wound fishing line gets short.

These days, in order to enhance releasing performance of a fishing line, there is proposed a spool having a front flange member and a fishing line winding body portion integral with the front flange member, which is constructed such that the fishing line winding body portion is displaced radially outwardly of an axis of a spool to thereby form a relatively shallow groove, and that a height of the front flange member is reduced to thereby reduce an angle at which the fishing line contacts with the front flange member, whereby a fishing line releasing resistance is reduced.

However, if a structure of securing the above mentioned front flange member is merely applied to a spool having a shallow spool, a connection of the separately formed flange and the fishing line winding body portion is disposed closer to an outer surface of the front flange member, and an area for retention is small. Therefore, the separately formed front flange member and a member for fixing the separately formed front flange member are liable to deform by a tension force of the released fishing line, and the front flange member and the member for fixing the front flange member are plastically deformed. Hence, there is formed a gap between the front flange member and a distal end of the fishing line winding body portion, and consequently a fishing line is liable to jam, and there is generated a resistance for releasing a fishing line. In the worst case, a fishing line is damaged, which causes a problem of breakage of a fishing line.

In order to increase an area for retention, if the fishing line winding body portion is designed to have a greater thickness in the aforementioned structure of securing the separately formed front flange member, there is encountered a problem that a weight of a spool is increased.

SUMMARY OF THE INVENTION

In view of the above mentioned shortcomings, it is an object of the present invention to provide a spinning reel used for fishing which is provided with a lightened spool without producing a gap between a separately formed front flange member and a body portion around which a fishing line is wound.

In order to solve the above mentioned problem, the present invention provides a spinning reel used for fishing in which a front flange member of a spool is separately formed from a spool body, and the front flange member is adapted to be integrally secured to the spool body through a fixing member, characterized in that a recessed portion is formed in a front and circumferentially inner portion of the spool body, that the separately formed front flange member contacts a front end of the spool body so as to close a front opening of the recessed portion, and that the front flange member is secured by means of a fastening member screwed to a cylindrical member located inside of the recessed portion to thereby define a space with the recessed portion inside a body portion around which a fishing line is to be wound.

The fastening member is formed with a portion at which the front flange member is radially and inwardly received.

In the present invention, since a front flange member is made of ceramics or is formed by a metal member on which surface-processing for wear resistance is applied, a fishing line can be released without being damaged.

A plate portion of the front flange member is brought into contact with a front end of a fishing line winding body portion and held by the front end of the fishing line winding body portion and a plate portion of a fastening member. Further, a received portion of the front flange member is retained on an outer surface of a cylindrical portion of the fastening member. Thus, the front flange member is not loosened by a winding force of a fishing line and a tension force generated when a fishing line is released.

Since the front flange member is retained without being deformed, no gap formed between the front flange member and a front end of the fishing line winding body portion 1a. Thus, a fishing line is prevented from biting, and hence a fishing line is not damaged and broken, resulting in improvement in releasing performance of a fishing line.

If the inside of the fishing line winding body portion of a spool body is formed into a space defined by a plurality of recessed portions, it is possible to lighten the spool, and also possible to cool down a heat generated in a drag mechanism.

DESCRIPTION OF THE PREFERRED EMBODIMENTS

Figure 1:
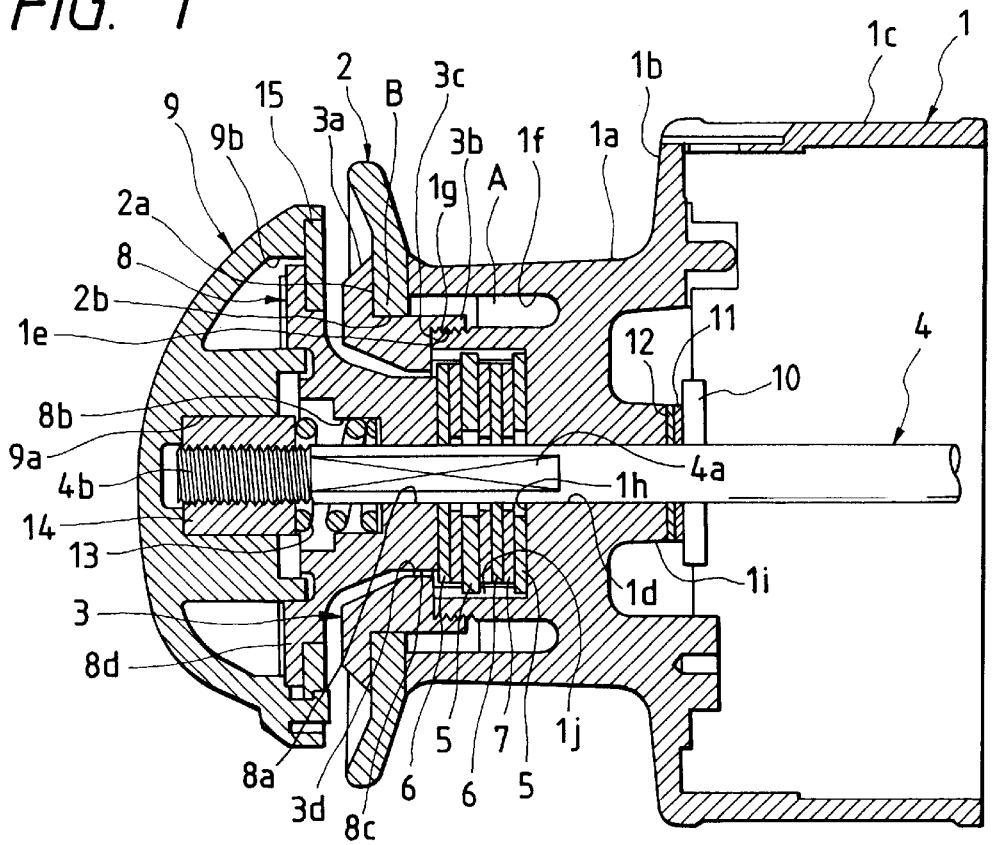
FIG. 1 is a cross-sectional side view of a spool for a spinning reel used for fishing in accordance with the first embodiment.
Figure 2A:
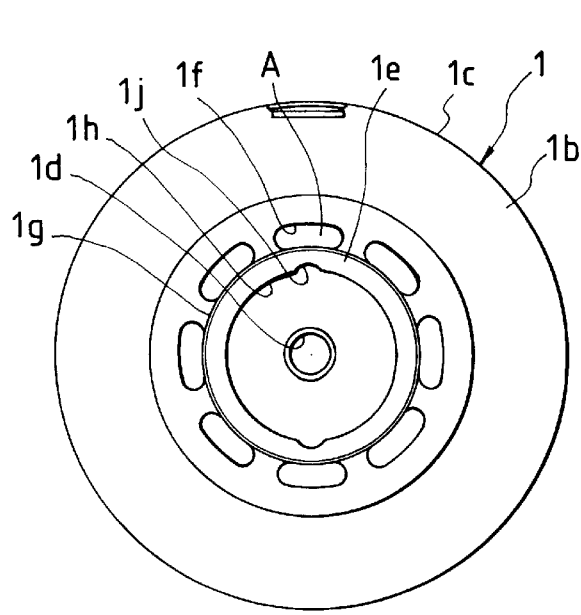
FIG. 2(a) is a front view.
Figure 2B:
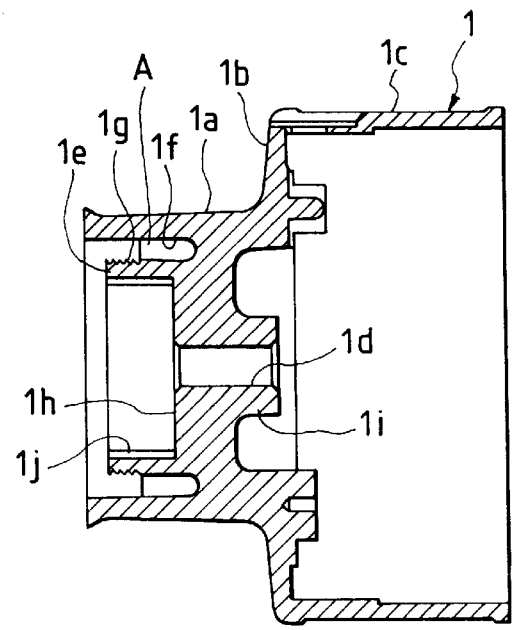
FIG. 2(b) is a cross-sectional side view of the spool.
Figure 3:
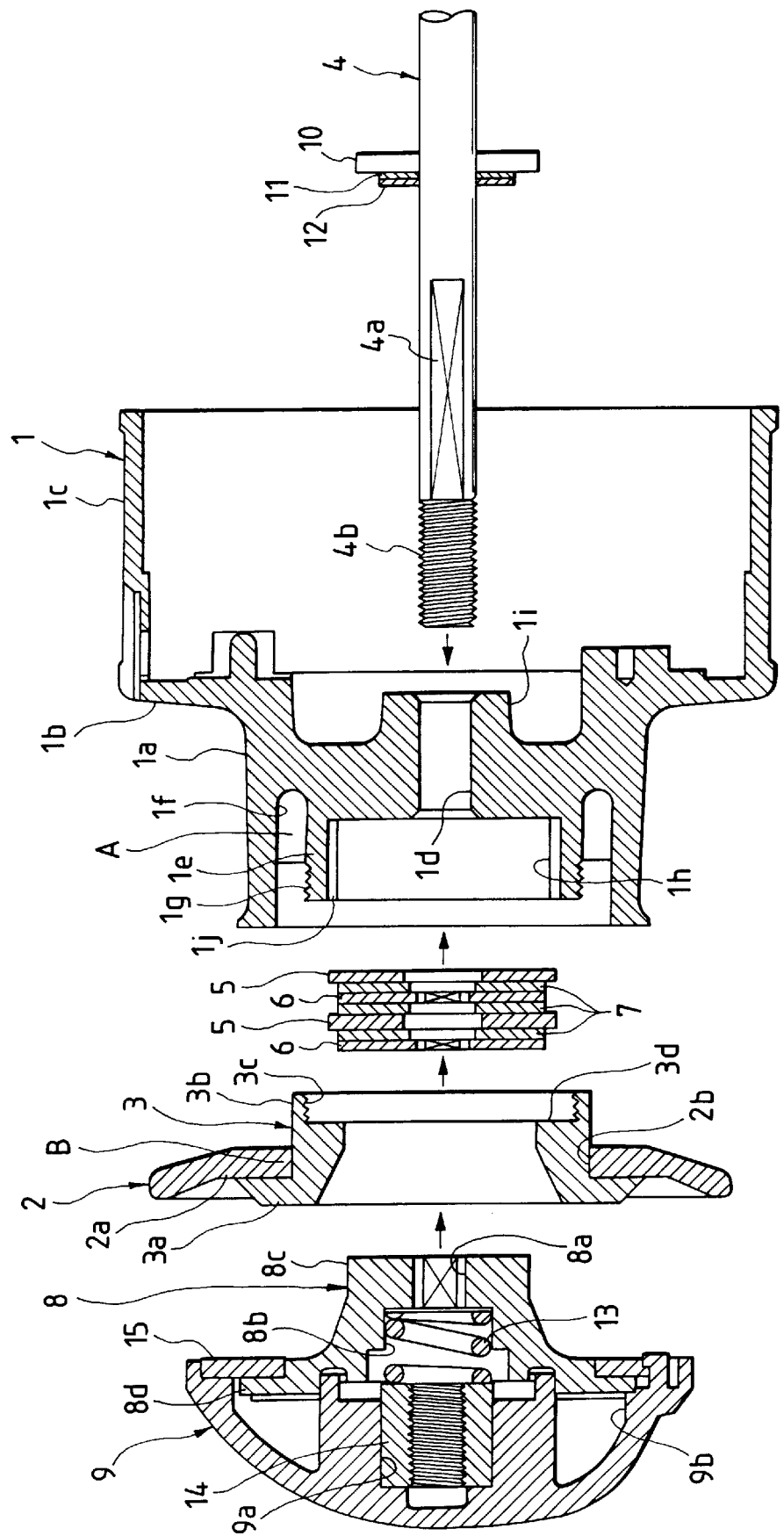
FIG. 3 is an exploded cross-sectional side view of the spool.

The present invention is described hereinbelow in connection with illustrated embodiments. FIGS. 1 to 3 illustrate the first embodiment. FIG. 1 is a cross-sectional side view of a spool of a spinning reel used for fishing, FIG. 2(a) is a front view of a spool, FIG. 2(b) is a cross-sectional side view of a spool, and FIG. 3 is an exploded cross-sectional side view of a spool.

In a spool of a spinning reel used for fishing, a front flange member 2 is integrally fixed in front of a spool body 1 by means of a fastening member 3. The spool body 1 includes a fishing line winding body portion 1a which is defined by an outer surface and around which a fishing line is wound, a rear flange member 1b, a larger diameter cylindrical portion 1c at the rear of the rear flange member, a through hole 1d into which a tip end of a spool shaft 4 is fit, a cylindrical portion 1e inside the spool body 1, a space A located outside the cylindrical portion 1e and defined by a plurality of recessed portions 1f, an externally threaded portion 1g formed an outer surface of and at a distal end of the cylindrical portion 1e, a recessed portion 1h formed inside the cylindrical portion 1e for receiving therein a braking plate 5, a braking plate 6 and a frictional plate 7 of a drag mechanism, and a shaft cylindrical portion 1i at the rear.

The recessed portion 1h is formed inside with two recessed portions 1j to which projecting portions of the braking plate 5 are engaged.

The front flange member 2 is formed on the ring-shaped plate portion 2a.

The plate portion 2a is formed at its central portion with a large diameter through hole 2b to define a received portion B.

The front flange member 2 is made of ceramics or metal. When the front flange member is made of metal, the front flange member is surface-processed for wear resistance.

The fastening member 3 has a projecting configuration in a cross-section by a plate portion 3a and a cylindrical portion 3b.

The cylindrical portion 3b is formed at its rear end with an internally threaded portion 3c, and a portion located in front of the internally threaded portion 3c is projected towards the center to define a portion 3d for preventing falling off.

The plate portion 3a is brought into abutment with the plate portion 2a of the front flange member 2, and the through hole 2b of the front flange member 2 is fitted on an outer surface of the cylindrical portion 3b.

The internally threaded portion 3c is threadingly engaged with the externally threaded portion 1g of the spool body 1.

The fastening member 3 is formed at its front surface thereof with a groove or a hole (not illustrated) for fastening.

The spool shaft 4 is formed at its distal end and on an outer surface thereof with a rotation preventing portion 4a, and also formed with an externally threaded portion 4b adjacent to the rotation preventing portion 4a.

The braking plate 5, the braking plate 6 and the frictional plate 7 are fitted on the spool shaft 4 at a distal end and on an outer surface thereof, and the braking plate 6 is prevented from rotation by the rotation preventing portion 4a.

When the spool shaft 4 is fitted at its distal end thereof into the spool body 1, a pin 10 is fixed perpendicularly to the spool shaft 4, and a friction plate 11 and a braking plate 12 are interposed between the shaft cylindrical portion 1i and the pin 10.

Fitted around the rotation preventing portion 4a formed at a distal end of the spool shaft 4 is a rotation preventing portion 8a of a compressing member 8 of the drag mechanism. A spring 13 is inserted into a recessed portion 8b of the compressing member 8.

A nut 14 attached to a recessed portion 9a of an adjusting handle 9 of the drag mechanism is threadingly engaged with the externally threaded portion 4b formed at a distal end of the spool shaft 4.

The compressing member 8 is comprised of a compressing portion 8c and a flange portion 8d. The compressing portion 8c is formed with a rotation preventing hole 8a.

The flange portion 8d of the compressing member 8 is rotatably inserted into a recessed portion 9b having a large diameter, of the adjusting handle 9, and is prevented from being removed therefrom by a stopper plate 15.

When a spool is assembled, the externally threaded portion 1g of the spool body 1is threadingly engaged with the internally threaded portion 3c of the fastening member 3, and the plate portion 2a of the front flange member 2 is brought into abutment with the front end of the fishing line winding body portion 1a, and further the received portion B of the front flange member 2 is retained around an outer surface of the cylindrical portion 3b of the fastening member 3.

When the front flange member 2 is fixed by the threading engagement between the cylindrical portion 1e of the spool body 1 and the fastening member 3, the space A defined by the recessed portions 1f is closed by the front flange member 2.

The braking plate 5, the braking plate 6 and the frictional plate 7 are inserted into the recessed portion 1h. The rotation preventing portion 3d of the fastening member 3 is brought into abutment with an opening of the recessed portion 1h to thereby prevent the braking plate 6, the frictional plate 7 and the braking plate 5 from being removed therefrom.

When a braking force of the drag mechanism is to be adjusted, the adjusting handle 9 is rotated to thereby cause forward or backward movement of the compressing member 8 in an axial direction. When the compressing member 8 is caused to move forward, the braking plate 5, the braking plate 6, the frictional plate 7, the frictional plate 11 and the braking plate 12 are compressed with the result that a braking force is increased.

When a spool is constructed as mentioned above and a catch device (not illustrated) is thrown away, a fishing line (not illustrated) wound around the body portion 1a is released.

At this time, since the front flange member 2 is made of ceramics or formed by metal on which surface-processing or surface treatment for wear resistance is applied, a fishing line is released without being damaged.

Since the plate portion 2a is brought into contact with a front end of the body portion 1a and is sandwiched by the plate portion 3a of the fastening member 3, and since the received portion B is retained around an outer surface of the cylindrical portion 3b of the fastening member 3, the front flange member 2 is not loosened by a winding force of a fishing line or a tension force generated when a fishing line is released.

Since the front flange member 2 is retained without being deformed, no gap is formed between the front flange member and a front end of the fishing line winding body portion 1a. Thus, a fishing line is prevented from biting or being caught by such gap, and hence a fishing line is not damaged and broken, resulting in improvement in releasing performance of a fishing line.

Since the inside of the fishing line winding body portion 1a of the spool body 1 is formed into a space A defined by a plurality of recessed portions 1f, it is possible to lighten the spool, and also possible to cool down the heat generated in the drag mechanism.

As a spinning reel used for fishing is constructed in the above mentioned manner, the front flange member 2 which is made of ceramics or metal which is surface-treated for wear resistance is retained without being deformed. Thus, a fishing line is released without being damaged. Since there is formed the space A, it is possible to make the spool lighter in weight, and also possible to cool down the heat generated in the drag mechanism.

In addition, since the received portion B of the front flange member 2 is retained by the fastening member 3, the front flange member 2 is not deformed even if it receives a tension force from a fishing line being released.

Figure 4:
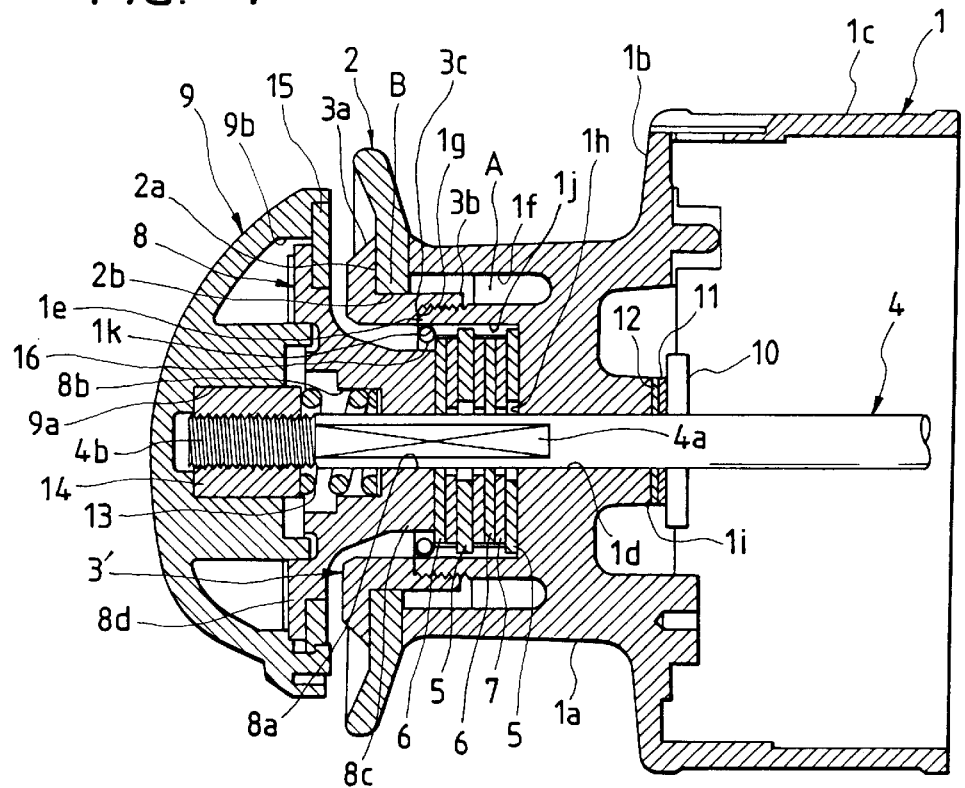
FIG. 4 is a cross-sectional side view of a spool for a spinning reel used for fishing in accordance with the second embodiment.
Figure 5A:
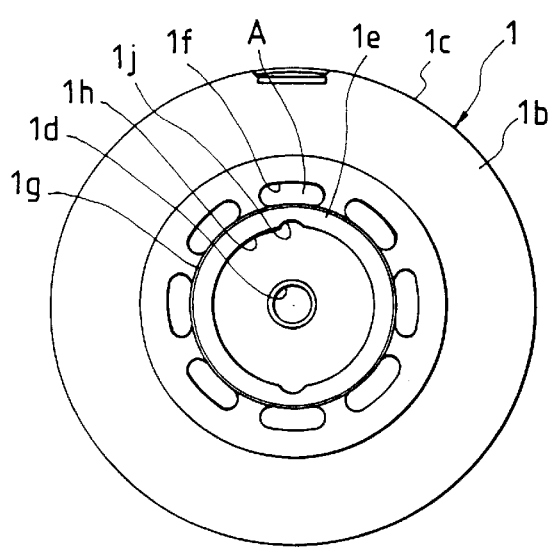
FIG. 5(a) is a front view.
Figure 5B:
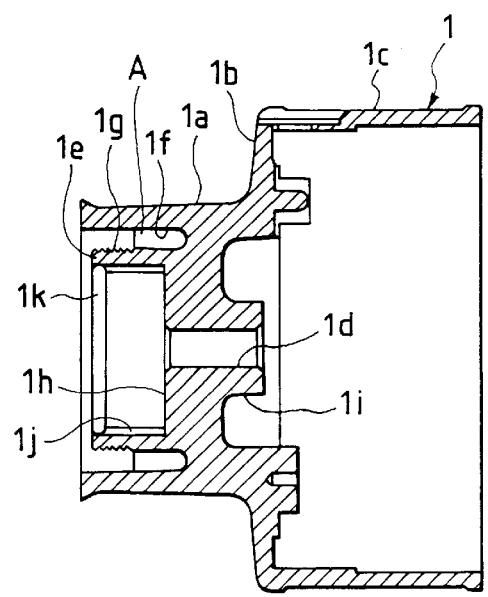
FIG. 5(b) is a cross-sectional side view of the spool.

FIGS. 4, 5(a) and 5(b) illustrate the second embodiment. FIG. 4 is a cross-sectional side view of a spool of a spinning reel used for fishing, FIG. 5(a) is a front view of a spool, and FIG. 5(b) is a cross-sectional side view of a spool.

In accordance with the second embodiment, in a spool of a spinning reel used for fishing, a front flange member 2 is integrally fixed in front of a spool body 1 by means of a fastening member 3'. The spool body 1 includes a fishing line winding body portion 1a which is defined by an outer surface and around which a fishing line is wound, a rear flange member 1b, a larger diameter cylindrical portion 1c at the rear of the rear flange member, a through hole 1d into which a tip end of a spool shaft 4 is fitted, a cylindrical portion 1e inside the spool body 1, a space A located outside the cylindrical portion 1e and defined by a plurality of recessed portions 1f, an externally threaded portion 1g formed on an outer surface of and at a distal end of the cylindrical portion 1e, a recessed portion 1h formed inside the cylindrical portion 1e for receiving therein a braking plate 5, a braking plate 6, and a frictional plate 7 of a drag mechanism, and a shaft cylindrical portion 1i at the rear.

The inside of the recessed portion 1h is formed with two recessed portions 1j to which projecting portions of the control plate 5 are engaged.

The recessed portion 1h is formed at its inner surface adjacent an opening with a circumferential groove 1k which receives a ring 16 having a C-shaped cross-section. The braking plate 5, the braking plate 6 and the frictional plate 7 of the drag mechanism are prevented from being removed by means of the ring 16.

The fastening member 3' has a projecting configuration in a cross-section by a plate portion 3a and a cylindrical portion 3b.

The cylindrical portion 3b is formed at its rear end and on its inner surface with an internal threaded portion 3c.

The plate portion 3a is brought into abutment with the plate portion 2a of the front flange member 2, and the through hole 2b of the front flange member 2 is fitted on an outer surface of the cylindrical portion 3b.

The internally threaded portion 3c is threadingly engaged with the externally threaded portion 1g of the spool body 1.

The other structure is almost the same as those of the above mentioned first embodiment.

Figure 6:
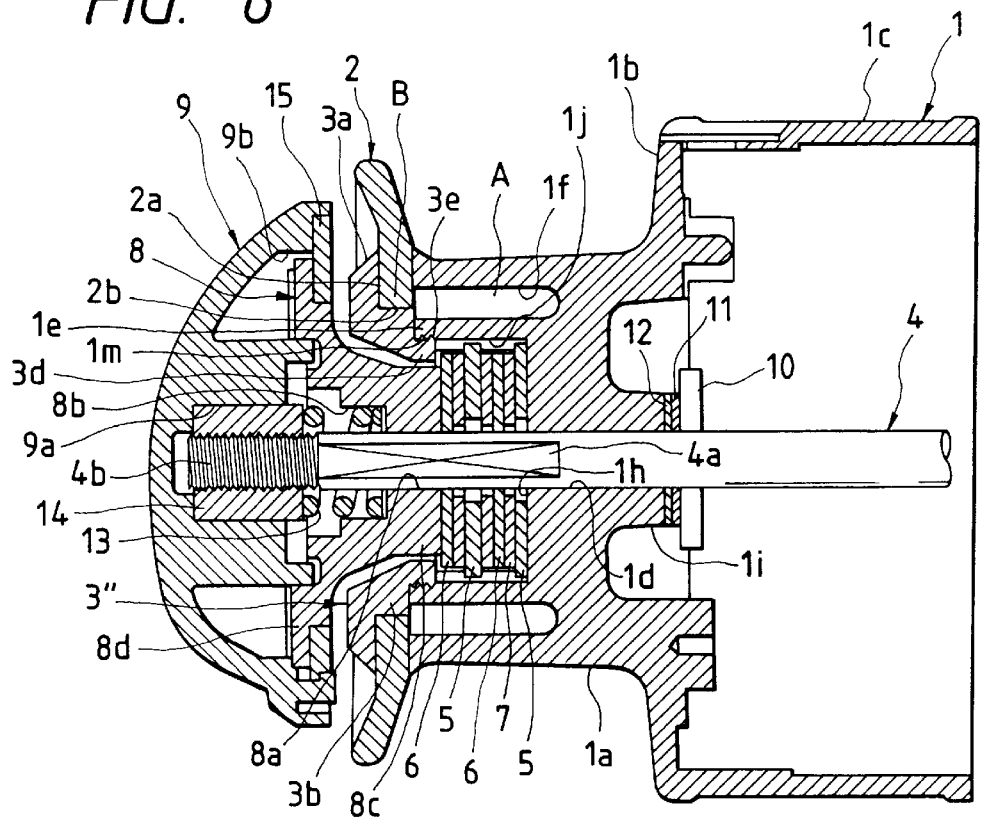
FIG. 6 is a cross-sectional side view of a spool for a spinning reel used for fishing in accordance with the third embodiment.
Figure 7A:
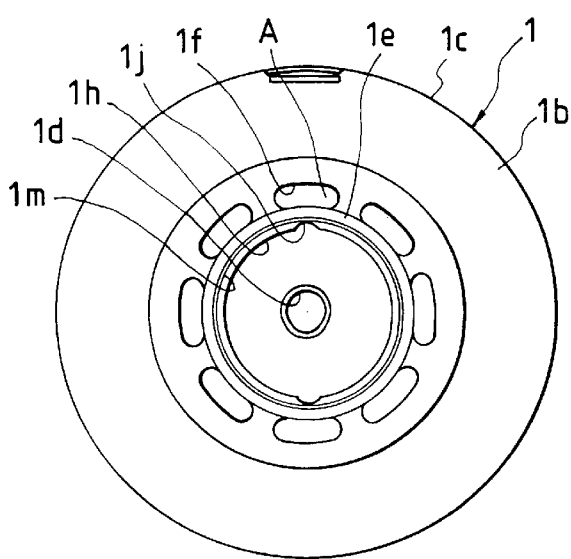
FIG. 7(a) is a front view.
Figure 7B:
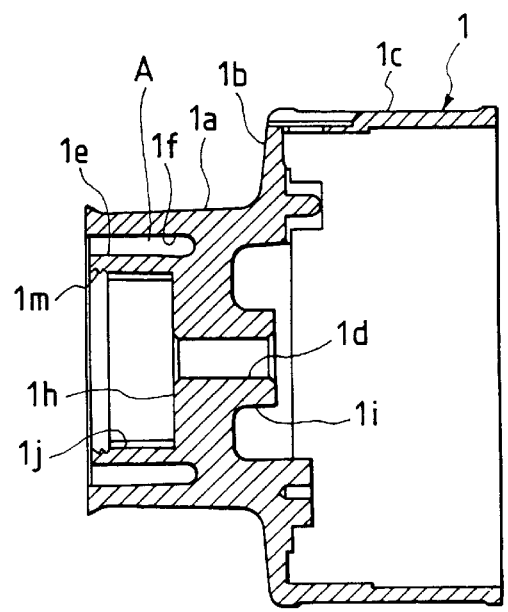
FIG. 7(b) is a cross-sectional side view of the spool.
Figure 8:
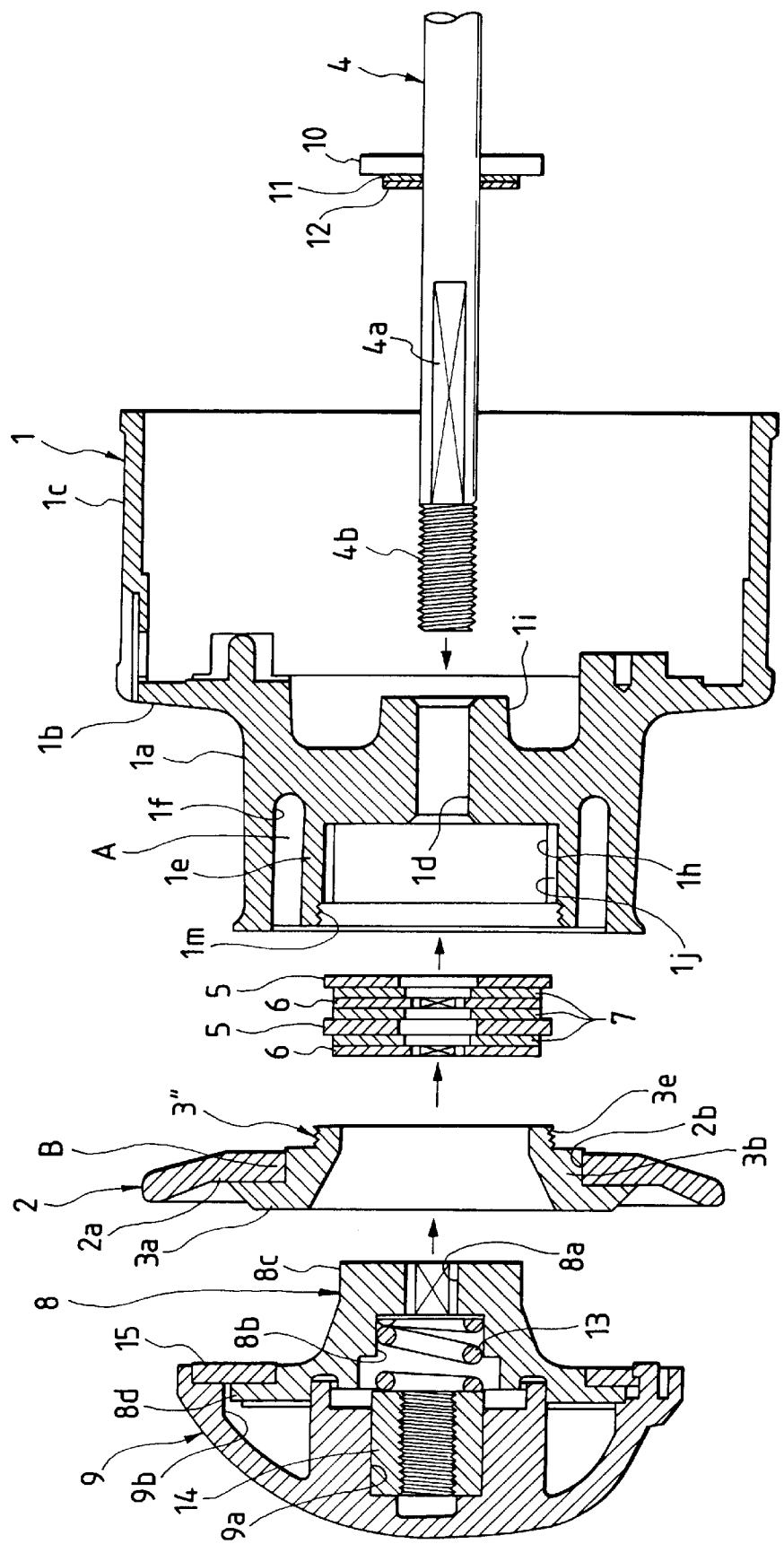
FIG. 8 is an exploded cross-sectional side view of the spool in accordance with the third embodiment.

FIGS. 6 to 8 illustrate the third embodiment. FIG. 6 is a cross-sectional side view of a spool of a spinning reel used for fishing, FIG. 7(a) is a front view of a spool, FIG. 7(b) is a cross-sectional side view of a spool, and FIG. 8 is an exploded cross-sectional side view of a spool.

In accordance with the third embodiment, in a spool of a spinning reel used for fishing, a front flange member 2 is integrally fixed in front of a spool body 1 by means of a fastening member 3". The spool body 1 includes a fishing line winding body portion 1a which is defined by an outer surface and around which a fishing line is wound, a rear flange member 1b, a larger diameter cylindrical portion 1c at the rear of the rear flange member, a through hole 1d into which a tip end of a spool shaft 4 is fitted, a cylindrical portion 1e inside the spool body 1, a space A located outside the cylindrical portion 1e and defined by a plurality of recessed portions 1f, an internally threaded portion 1m formed at an outer surface of and at a distal end of the cylindrical portion 1e, a recessed portion 1h formed inside the cylindrical portion 1e for receiving therein a braking plate 5, a braking plate 6, and a frictional plate 7 of drag mechanism, and a shaft cylindrical portion 1i at the rear.

The inside of the recessed portion 1h is formed with two recessed portions 1j to which projecting portions of the control plate 5 are engaged.

The fastening member 3" has a projecting configuration in a cross-section by a plate portion 3a and a cylindrical portion 3b.

The cylindrical portion 3b is formed at its rear end and on its outer surface with an externally threaded portion 3e, and a portion located inside of the externally threaded portion 3e is projecting towards the center to define a portion 3d for preventing removal.

The plate portion 3a is brought into abutment with the plate portion 2a of the front flange member 2, and the through hole 2b of the front flange member 2 is fitted on an outer surface of the cylindrical portion 3b.

The externally threaded portion 3e is threadingly engaged with the internally threaded portion 1m of the spool body 1.

The other structure is almost the same as those of the above mentioned first embodiment.

The present invention is reduced into practice in embodiments as mentioned above, and provides advantageous effects as mentioned below.

Since the front flange member is retained without being deformed, a fishing line can be released without being damaged. Since there is formed the space, it is possible to make a spool lighter in weight, and also possible to cool down a heat generated in the drag mechanism.

Since the received portion formed radially and inwardly of the front flange member is retained by means of the fastening member, the front flange member is not deformed even if it receives a tension force from a fishing line being released.

What is claimed is:

1. In a spinning reel used for fishing a spool having a front flange member separately formed from a spool body and integrally secured to the spool body through a fastening member, wherein a recessed portion is formed in a front and circumferentially inner portion of the spool body;

wherein the front flange member contacts a front end of the spool body so as to close a front opening of the recessed portion;

wherein the front flange member is secured by means of the fastening member screwed to a cylindrical portion of the spool body located radially inside of the recessed portion;

wherein a hollow space is defined by the recessed portion and located inside a fishing line winding portion of the spool body, around which a fishing line is wound; and wherein the front flange member has a received portion received by the fastening member.

2. A spool as set forth in claim 1, wherein the received portion is located radially inward relative to an outer circumference of the fishing line winding portion.

3. A spool as set forth in claim 1, wherein the cylindrical portion of the spool body has an externally threaded portion mating with an internally threaded portion of the fastening member.

4. A spool as set forth in claim 1, wherein the cylindrical portion of the spool body has an internally threaded portion mating with an externally threaded portion of the fastening member.

5. In a spinning reel used for fishing, a spool having a front flange member separately formed from a spool body, and integrally secured to the spool body through a fastening member, wherein a recessed portion is formed in a front and circumferentially inner portion of the spool body;

wherein the front flange member contacts a front end of the spool body so as to close a front opening of the recessed portion;

wherein the front flange member is secured by means of the fastening member screwed to a cylindrical portion of the spool body located radially inside of the recessed portion;

wherein a hollow space is defined by the recessed portion and located inside a fishing line winding portion of the spool body around which a fishing line is wound; and wherein front and rear surfaces of the front flange member are held between the fastening member and a distal end of the fishing line winding portion.

6. A fishing spinning reel, comprising:

a spool body comprising a surface portion configured to support a wound portion of a fishing line, a recessed portion located radially inward of said surface portion and defining at least one orifice, and a cylindrical portion located radially inward of said recessed portion;

a front flange member, forming an element separate from said spool body, and over which a released portion of the fishing line extends; and a fastening member secured to said spool body at said cylindrical portion and pressing said front flange member sealingly against said spool body to cover the at least one orifice.

7. A fishing spinning reel according to claim 6, wherein said recessed portion defines a plurality of cicumferentially spaced orifices, and wherein said front flange member covers each of the orifices.

\* \* \* \* \*